Sept. 9, 1924.  
L. C. HUCK  
1,507,963  
MECHANICAL SHIFTING MEANS FOR SPEED TRANSMISSION MECHANISMS  
Filed Jan. 14, 1921   6 Sheets-Sheet 1

Inventor:
Louis C. Huck.
By Jones, Addington, Ames & Seibold
Attys.

Sept. 9, 1924. 1,507,963
L. C. HUCK
MECHANICAL SHIFTING MEANS FOR SPEED TRANSMISSION MECHANISMS
Filed Jan. 14, 1921 6 Sheets-Sheet 4

Fig.7.

Inventor:
Louis C. Huck.
By: Jones, Addington, Ames & Seibold
Attys.

Patented Sept. 9, 1924.

1,507,963

UNITED STATES PATENT OFFICE.

LOUIS C. HUCK, OF CHICAGO, ILLINOIS.

MECHANICAL SHIFTING MEANS FOR SPEED-TRANSMISSION MECHANISMS.

Application filed January 14, 1921. Serial No. 437,167.

*To all whom it may concern:*

Be it known that I, LOUIS C. HUCK, a citizen of the United States, residing at Chicago, in the county of Cook and State of Illinois, have invented new and useful Improvements in Mechanical Shifting Means for Speed-Transmission Mechanisms, of which the following is a full, clear, concise, and exact description, reference being had to the accompanying drawing, forming a part of this specification.

My invention relates to improvements in devices for changing the positions of gears in transmission mechanisms and it has special reference to gear selecting and shifting devices for effecting the gear shifting operations of such speed transmission mechanisms as are adapted for use on automobiles.

One object of my invention is to provide an improved gear preselecting and shifting device of the character indicated above whereby the selected gear shifting operation in a speed transmission mechanism adapted for an automobile may be effected by the application of power derived from a foot pedal, which pedal may be an independent pedal or, preferably, the same pedal that controls the operation of the clutch mechanism.

Another object of my invention is to provide an improved gear preselecting and shifting device wherein a desired gear shift may be made in the speed transmission mechanism at any time and the selection for a subsequent gear shift may be made while any other of the possible gear shifts is being operated, such selected gear shift being effected upon the subsequent actuation or depression of the foot pedal.

Another object of my invention is to provide an improved device such as hereinbefore mentioned which, in connection with its being associated with the usual automobile speed transmission mechanism, will first restore any gear changing elements that may be in operative connection in the transmission mechanism to inoperative condition before another preselected gear change is subsequently made, the restoring to inoperative positions of any of the gear changing elements of the transmission mechanism, other than the one to effect the preselected gear change, being accomplished by the positive actuation or depression of the foot pedal in its initial movement which, likewise, effects the preselected gear change on its continued depression by the foot.

Another object of my invention is to provide an improved gear preselecting and shifting device for the speed transmission mechanisms of automobiles whereby a selected gear change, having been once effected and placed in operative condition, the change gear thus positioned in driving relation in the speed transmission mechanism will remain fixedly on subsequent depressions of the actuating foot pedal unless, meanwhile, a different preselection has been determined upon by the operator and made whereby this employed change gear is then moved to an inoperative position to permit of the making of the preselected gear change.

A further object of my invention is to provide an improved gear preselecting and shifting device which does not require a definite sequence of operative connections to be performed in cyclical order inasmuch as by my present device any one of the possible gear changes that the speed transmission mechanism is capable of effecting may be made irrespective of the gear connection immediately preceding.

A further object of my invention is to provide an improved gear preselecting and shifting device that may be readily and conveniently applied to any of the usual and standard automobile speed transmission mechanisms whereby the different gear changes comprising the positions known commonly as reverse, neutral, first speed, second speed and third speed, may be quickly effected and proper mesh or engagement of the sliding or shiftable change gears with the cooperating gears of the transmission mechanism may be ensured.

A further object of my present invention is to provide an improved gear preselecting and shifting device whereby a gear change, after being selected and properly indicated on the selecting portion of my aforesaid device, may be effected in predetermined relation to the actuating of the clutch mechanism of the automobile, the gear shifting portion of my aforesaid device being preferably connected to the usual clutch operating pedal through a lost motion connection and in such a manner that the said selected gear change will be made when said pedal has been operated to disengage the clutch mechanism whereby the transmission mechanism is temporarily disconnected from the automobile. As a consequence, the transmission mechanism is not liable to any injury that might result should an attempt be made to engage or disengage any one of the change gears of the transmission mechanism while the clutch mechanism is in engagement with the driving member of the automobile.

A further object of my invention is to provide an improved device of the character indicated, which device may be positioned directly upon any of the standard and common forms of automobile speed transmission mechanism casings and may be used to effect all of the speed changes that such transmission mechanisms are capable of having performed upon them, the device of my present invention being of compact structure whereby it may be positioned, except for the controlling members accessible to the operator of the automobile, below the floor boards of the automobile without requiring any special construction in the floor.

Another object of my invention is to provide an improved gear preselecting and shifting device which is simple and rugged in construction, devoid of any mechanically faulty elements, such as spring elements, intricately machined parts and the like, and economical to manufacture, assemble and adapt to automobile speed transmission mechanisms.

Other objects and ends to which my present invention is adapted will hereinafter be described more fully, the novel features of my device being pointed out with particularity in the claims appended to and forming a part of this specification.

Corresponding parts, members and elements shown in the drawings are designated by the same reference characters in the several views.

Figure 1:
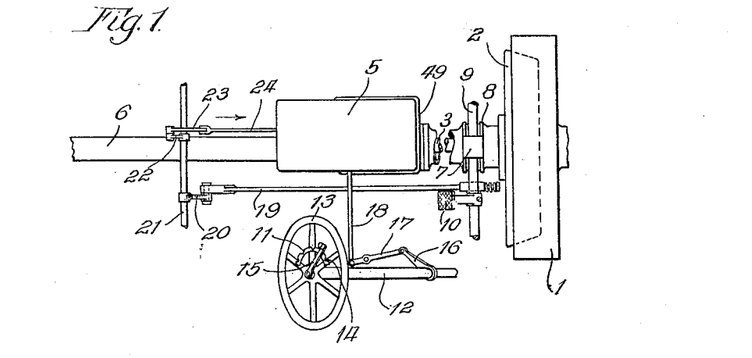
Fig. 1 is a plan view of a portion of a mechanism comprised in an automobile showing my present gear preselecting and shifting device associated therewith.

Referring to Fig. 1 wherein certain parts of an automobile structure are shown, a flywheel 1 of the usual automobile motor or engine makes a driving connection through a cooperating clutch member 2 with the usual driving shaft 3. The driving shaft 3 is connected to a standard changeable speed transmission mechanism, such as is commonly employed in automobiles, which mechanism is housed in a casing 4 upon which is mounted my speed or gear shifting mechanism 5. The changeable speed transmission mechanism contained within the housing 4, and used in connection with the present exemplification of my invention, is of the sliding gear type comprising two change gears, the relative positions of which in the speed transmission mechanism effect the well known gear shifts; namely, neutral, reverse, first speed, second speed and third speed. Power is transmitted to the rear axle of the automobile through a driven shaft 6, the speed of rotation of which is controlled by the changeable speed transmission mechanism contained in the housing 4.

The clutch member 2 cooperates with the engine fly-wheel 1 in the well known manner under the action of springs. Engagement and disengagement between the clutch member 2 and the fly-wheel 1 is controlled by a usual forked member 7 which cooperates with a grooved clutch shifting collar 8, the fork 7 being connected to a suitably mounted rock-shaft 9 which, in turn, is operated by a clutch pedal 10, through a lost motion action, to cause engagement and disengagement of the clutch member 2 with the fly-wheel 1. The clutch actuating mechanism just described, may be of any of the standard forms of construction usual in automobiles.

In the present embodiment of my invention, my gear shifting mechanism is mounted above and secured to the usual speed transmission mechanism casing 4 in which are contained the two shiftable change gears common to the particular standard transmission mechanism which I have selected for use in conjunction with my device. The gear shifting mechanism 5 is illustrated in detail in the other figures comprised in the drawings of this specification and the construction and method of operation thereof will be subsequently described.

In connection with the gear shifting mechanism 5, I employ a relatively simple gear shift selector whereby manual preselection and pre-setting of the gear shifting mechanism may be effected so that the sliding change gears comprised in the speed transmission mechanism may be shifted from one connection corresponding to a certain speed to another connection corresponding to any other speed or to a rearward movement of the automobile or to neutral position. To accomplish the foregoing end conveniently, I mount a sector 11 at the top of the steering wheel column 13. The sector 11 is provided with a suitable number of notches 14, corresponding to the gear shifts to be made, and cooperates with an appropriate dog comprised in a setting lever 15 which serves to properly position and retain the setting lever in any of its selected positions on the sector 11. The setting lever 15, which is adapted for manual operation by an operator, is rotatably mounted in the steering column 12 and is operatively connected to a lever 16 that rotates in unison with the said lever 15. A member (not shown) extending through the steering column 12 serves to operatively connect the setting lever 15 with the lever 16. The lever 16, in turn, is connected through a pivoted member 17 to a rod 18, this linkage serving to move the rod 18 in both directions transversely of the driving shaft 3. As will be hereinafter explained, the rod 18 is the member that serves to properly position the gear shifting members of the mechanism 5 whereby the various gear shifts to be effected in the speed transmission mechanism may be made, the said gear shifts being preselected in accordance with the positioning of the lever 15 on the sector 11.

From the foregoing it will be obvious that the setting lever 15 merely selects the desired gear change and that, as the position of the setting lever 15 is varied on the sector 11, this preselecting function is accompanied by a presetting function of the gear shifting mechanism 5. Moreover, it will be noted that the position of the setting lever 15 having been once selected, this position will not be varied until the lever is manually moved to any of the other desired positions that it may assume on the sector 11.

Since the setting lever 15 selects the desired gear change or shift and presets the gear shift device, the desired gear shift is effected by means of the positive actuation of the clutch pedal 10, as will be hereinafter described in detail. For the present, it may be noted that the clutch pedal 10 on rotating the rock shaft 9 likewise actuates a link 19 that is connected to a pivoted lever 20 that, in turn, serves to rotate a second rock shaft 21. The rock shaft 21 actuates a rocking lever 22 and two shifting links 23 and 24 that are connected thereto in seriatim, as shown. By the depression of the clutch pedal 10 or by its positive actuation, and through a lost motion action, the link 24 which is operatively connected, as will be hereinafter explained, to the gear shifting elements comprised in the device 5 is moved in the direction indicated by the arrow. On releasing the clutch pedal 10 so that it may occupy its normal position, such as when not engaged by the foot of the operator, the link 24 is restored to its normal and inoperative position by reason of the action of the usual springs that are always associated with the common form of clutch pedals used in automobiles. When the shifting link 24 is moved in the direction of the arrow the members of the gear shifting device actuated thereby are moved to effect the gear change in accordance with the gear change that has previously been preselected by positioning the said lever 15 in the proper notch 14 on the sector 11.

As is well known, the usual standard speed transmission mechanism of the sliding gear type for automobiles is contained in a housing that is supported upon the chassis of the automobile. The speed transmission mechanism comprises two change gears, each one of which is capable of being drawn into, and out of, engagement with those gears of the said mechanism that are not capable of having their positions changed. The shifting of the two change gears mentioned above is accomplished by means of forked members that severally engage the change gears to which they are attached by embracing grooved collars formed upon the change gears. The two forked members are secured to shifter rods that are slidingly mounted at the top of the speed transmission casing. In the common form of construction the gear shifting lever that is manually operated by the operator of the car to effect the various gear changes and shifts in the speed transmission mechanism moves the aforementioned forked members with the shifter rods to and fro, thereby meshing the proper change gear or effecting the proper speed change in the speed transmission mechanism. Inasmuch as speed transmission mechanism of this form are well known, I have only indicated in Fig. 2 forked members 25 and 26 which serve to move the change gears into, and out of, engagement, the gear elements comprised in the speed transmission mechanism being not shown.

Figure 2:
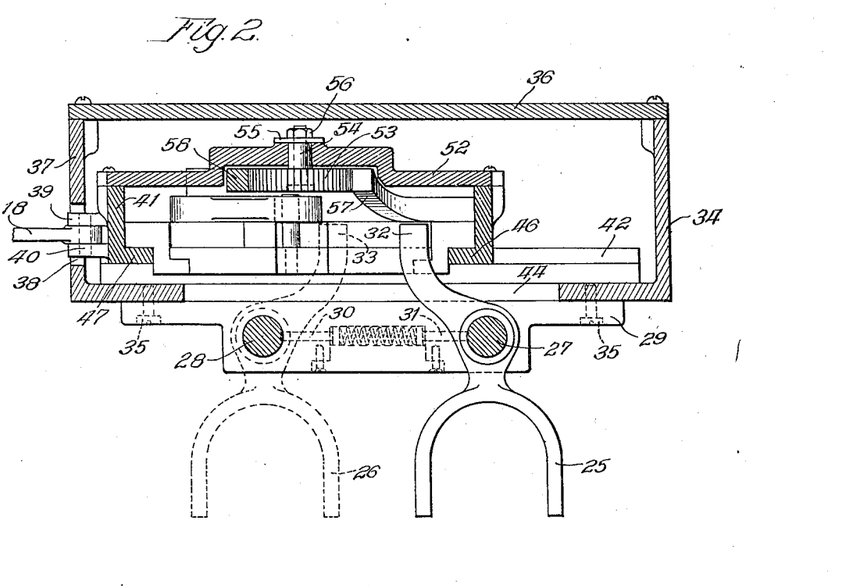
Fig. 2 is a cross sectional view of my device taken along the line 6—6 of Fig. 6, this view showing my device in association with the two shift rods and the cooperating forks for the two change gears that are comprised in all standard speed transmission mechanisms for automobiles of the sliding gear type.

Referring particularly to Fig. 2 the forked members 25 and 26 which are present in all of the standard speed transmission mechanisms of the sliding gear type and which severally engage the change gears by means of which the various gear shifts in the speed transmission mechanism may be effected, are secured to shifter rods 27 and 28, respectively, that are slidingly mounted at the top of the speed transmission casing into two spaced brackets 29.

Spring pressed pins 30 and 31 are adapted to engage the usual spaced recesses that are formed longitudinally in the shifter rods 27 and 28. The pins 30 and 31 serve to retain the shifter rods in fixed positions so as to preclude the change gears from becoming unmeshed with the other gears comprised in the speed transmission mechanism after the proper change gear has been placed in position. The forked members 25 and 26 are provided with upstanding lugs 32 and 33, respectively, the upper ends of which project above the casing enclosing the transmission mechanism.

My present gear shifting device is adapted to engage the lugs 32 and 33 and by this engagement the various gear changes or shifts that the transmission mechanism is capable of assuming are made. Therefore, in the other views illustrating the present embodiment of my invention, the lugs 32 and 33 are shown in lieu of the change gears of the speed transmission mechanism to which they are severally and directly connected. It is obvious that actuation of the lugs 32 and 33 imparts corresponding movements to the change gears that are secured thereto.

My gear shifting device is mounted upon the top of the casing enclosing the speed transmission mechanism and comprises an enclosing casing 34 that may be conveniently secured to the two spaced brackets 29 by means of screws 35. The enclosing casing 34 is stationary and is provided with a cover 36 that may be conveniently removed and which is accessible when the floor boards of the automobile are withdrawn. The side wall 37 of the enclosing casing 34 is provided with an opening 38 through which the rod 18 of Figure 1 projects. The rod 18 rotatably engages a lug 39 by means of a cylindrical pin 40. The lug 39 is secured to one side of a sliding box 41 in which the gear shifting elements adapted to engage the lugs 32 and 33 are housed.

Figures 3, 4, 5:
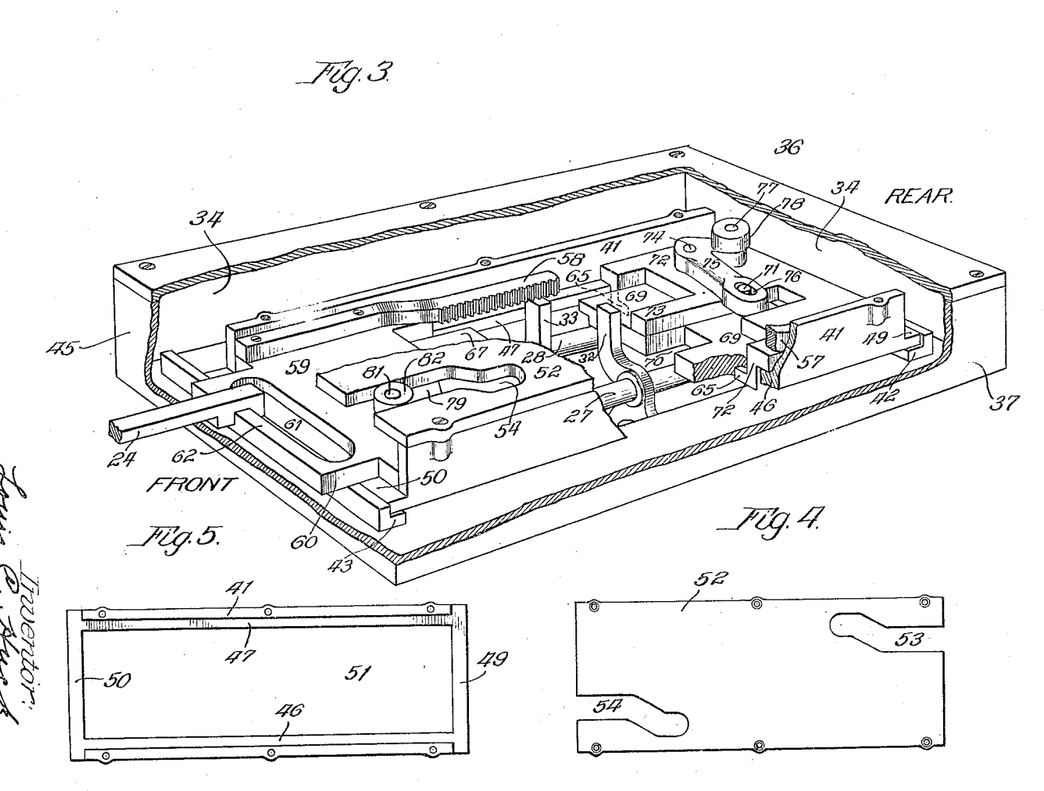
Fig. 3 is a view in perspective of my gear shifting device in which the enclosing casing and the guide cover are partly broken away in order to show the mutual relationship between the various elements forming my present device and to show the positioning of the sliding box in the enclosing casing.
Fig. 4 is a plan view of the guide cover applied to the top of the sliding box.
Fig. 5 is a plan view of the sliding box of Fig. 3, the proportions of the members illustrated in Figs. 4 and 5 being reduced for convenience only.

By referring to Fig. 3 it will be observed that the sliding box 41 slidingly engages at its ends 49 and 50 and on the under faces thereof, two spaced tracks 42 and 43, these tracks extending transversely of the enclosed casing 34 to the floor of which they are secured.

The rod 18, as explained in connection with Fig. 1, has imparted thereto a to-and-fro motion transversely of the driving shaft 3. Again, the rod 18 has this motion imparted thereto by reason of its being actuated by the setting lever 15 that is to be manually operated by the operator of the automobile. The to-and-fro motion imparted by the rod 18 serves to move the sliding box 41 upon the two tracks 42 and 43. In this fashion, the preselecting of the gear change or shift is effected inasmuch as the relative positions of the operating members housed in the sliding box 41 may be varied with respect to the two lugs 32 and 33 that serve to effect all of the shifting of the change gears. It is to be observed that the bottom of the enclosing casing 34 is provided with an opening 44 through which the two lugs 32 and 33 project and over which the sliding box 41 is positioned on the tracks 42 and 43.

The front end 45 of the enclosing casing 34 is also provided with an opening, not shown in Fig. 3 because of the enclosing casing being broken away at this point, through which opening the shifting link 24 of Fig. 1 extends. As hereinbefore explained, the movement of the shifting link 24 in the direction of the arrow is effected by the positive actuation or depression of the clutch pedal 10. The link 24 is restored to its normal or inoperative position, which is shown in Fig. 3, when the operator's foot is removed from the clutch pedal 10, this restoring being effected by reason of the common clutch springs that constantly urge the clutch pedal to assume its inoperative position when released from engagement with the operator's foot.

The sliding box 41, as shown in Fig. 5, comprises a hollow rectangular frame which is provided at its lower edge and along its two sides with inwardly projecting flanges 46 and 47. The ends of the sliding box are also provided with the outwardly extending flanges 49 and 50 that slidingly engage with the tracks 42 and 43, respectively. The bottom of the sliding box 41 is provided with a large rectangular opening 51 which bridges the opening 44 formed in the enclosing casing 34 and, likewise, the opening formed in the top of the casing enclosing the speed transmission mechanism. The sliding box 41 is also provided with a guide cover 52 that has guideways 53 and 54 cut in diagonally opposite corners thereof. The purpose of the guideways 53 and 54, will be hereinafter explained. As shown in Fig. 2, the central portion of the guide cover 52 is expanded to receive a pinion 53ᵃ that is rotatably mounted upon a holding pin 54 that, in turn, is held in position by means of a flanged bushing 55 and a nut 56. The pinion 53ᵃ is free to revolve upon the axis provided by the pin 54 and engages at diametrically opposite points of its pitch line two oppositely extending racks 57 and 58. The racks 57 and 58 are adapted to move certain elements in unison either towards or away from each other equal distances.

Figures 8, 9:
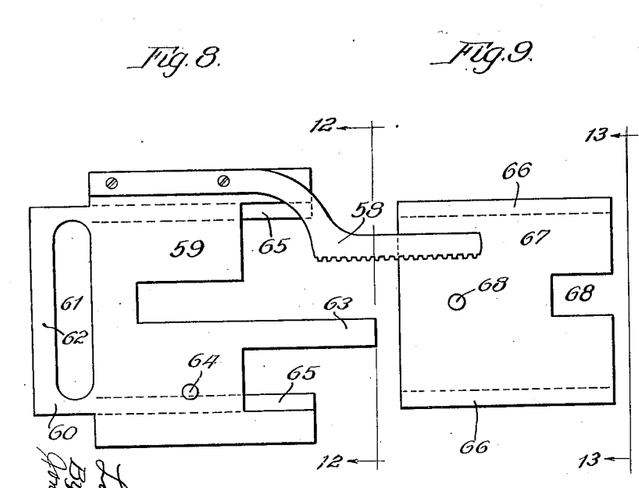
Fig. 8 is a plan view of the front sliding plate comprised in my device and shown in Figs. 3, 6 and 7.
Fig. 9 is a plan view of the front neutralizing plate that is adapted to be received within the front sliding plate and slidingly engage therewith.
Figure 12:
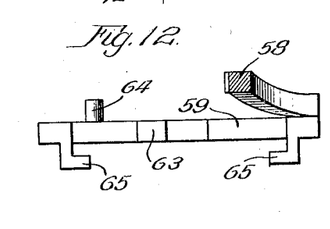
Fig. 12 is an end view of the member of Fig. 8 and taken in the direction of the line 12—12 of Fig. 8.

In order to more fully understand the assembly of the operating elements and members housed in the sliding box 41 attention is now directed to Figs. 8 to 13, inclusive. The member 59 of Figs. 8 and 12 is designated as a front shifting plate and is provided on its exposed side with an extension 60 that is transversely slotted at 61 in which the forked end of the shifting link 24 is received, thereby permitting of the movement of the plate 59 in accordance with the motion of the link 24. The forked end of the link 24 may have its position varied in the slot 61 because of the sliding engagement effected between the forked end of the link 24 and the engaged edge 62 bounding the slot 61. The rack 58 is secured to the upper face of the front shifting plate 59, substantially as shown. The operating end of the plate 59 is irregularly recessed for purposes to be hereinafter explained. For the present, I will direct attention to the protruding finger 63 which serves, under certain conditions, to engage one or the other of the two upstanding lugs 32 and 33 that are connected to the change gears of the speed transmission mechanism. An upwardly projecting pin 64 is likewise secured to and mounted on the upper face of the plate 59. The underface of the plate 59 is provided with two spaced and inwardly projecting flanges 65 that slidingly engage correspondingly dimensioned flanges 66 formed on the underside of the member 67 illustrated in Figs. 9 and 13 and which I will designate as a front neutralizing plate. The plate 67 is received within the plate 59 and slidingly engages therewith when certain conditions obtain, as will be later observed. A pin 68 is mounted on the outer face of the plate 67 and the operating face of the plate 67 is recessed at 68.

Figures 10, 11, 13:
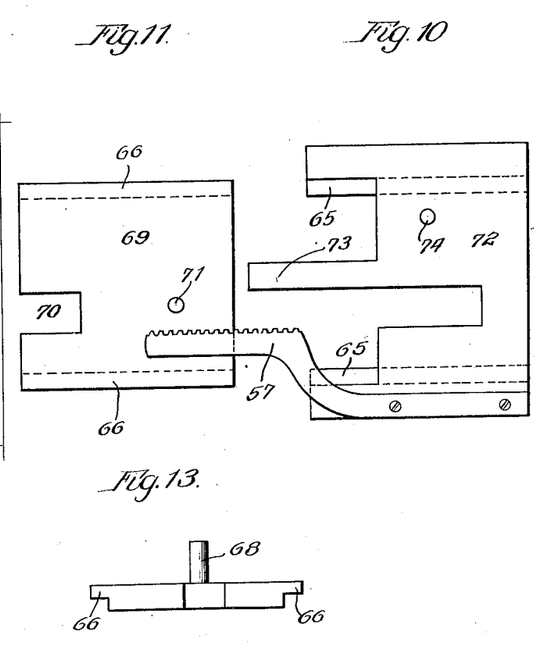
Fig. 10 is a plan view of the rear sliding plate comprised in my device and shown in Figs. 3, 6 and 7.
Fig. 11 is a plan view of the rear neutralizing plate that is adapted to be received within the rear sliding plate and slidingly engage therewith in the manner best illustrated in Fig. 3.
Fig. 13 is an end view of the member of Fig. 9 and taken in the direction of the line 13—13 of Fig 9.

The member illustrated in Fig. 11 and designated as a rear neutralizing plate 69 is similar to the front neutralizing plate 67, except for the location of a recess 70 and an upstanding pin 71. The member illustrated in Fig. 10 and designated as a rear shifting plate 72 is similar to the front shifting plate 59 of Fig. 8 except for the positioning of a protruding finger 73 and an upstanding pin 74. The rear neutralizing plate 69 is received in the rear shifting plate 72, as shown best in Fig. 3, and is adapted to slidingly engage therewith or to be rigidly connected thereto, as certain conditions obtain in the positioning of a pivoted lever 75 (Fig. 3) which is pivoted on the pin 74 and has one of its arms slotted at 76 to receive the pin 71. The other arm of the lever 75 is provided with an upstanding pin 77 upon which a guide roller 78 is rotatably mounted, the roller 78 being received in the assembled device in the guideway 53 formed at one corner of the guide cover 52 and slidingly engaging therewith.

When the lever 75 occupies the position shown in Fig. 3, the rear neutralizing plate 69 is positioned directly below the rear sliding plate 72 so that the two operating ends of said plates may coincide. At the same time, the guide roller 78 is received at the outer end of the straight portion of the guideway 53. Under these circumstances, the rear shifting plate 72 and the rear neutralizing plate 69 are incapable of moving relatively to each other, to any substantial degree, by reason of their being held in fixed position by the lever 75. As long as the roller 78 travels in the straight portion of the guideway 53, the two plates 72 and 69 are incapable of being moved relatively to each other. When the roller 78 travels in the oblique portion of the guideway 53, the neutralizing plate 69 is then maintained stationary and the shifting plate 72 is moved inwardly thereby effecting relative movement between the two plates 69 and 72. Therefore, it is to be observed that the guideway 53 is of such contour that the coaction of the guide roller 78 therewith serves to control the relative movements between the rear shifting plate 72 and the rear neutralizing plate 69.

Again, the oblique portion of the guideway 53 is so located with respect to the neutral positions of the two upstanding lugs 32 and 33 that the rear neutralizing plate 69 is brought to a stop when its operating end comes in contact with, or in close proximity to, the neutral positions of the said lugs. As the roller 78 travels along the oblique portions of the guideway 53, the rear shifting plate 72 continues to move inwardly while the rear neutralizing plate 69 remains stationary, the inward movement to the rear shifting plate 72 continuing until the roller 78 reaches the end of its length of travel in the guideway 53. Moreover, as the rear shifting plate 72 and the rear neutralizing plate 69 are precluded from moving relatively to each other as long as the guide roller 78 traverses the straight portion of the guideway 53, the said two plates are moved relatively to the sliding box 41 by reason of the sliding engagement of the plate 72 on the guideways 46 and 47, the plate 72 continuing to slide on the guideways 46 and 47 even after the rear neutralizing plate 69 is held stationary as the guide roller 78 traverses the oblique portion of the guideway 53. The protruding finger 73 formed on the operating end of the rear shifting plate 72 is adapted to engage either the lug 32 or the lug 33, or to pass by without engaging either of said lugs, all depending upon the positioning of the sliding box 41 on the tracks 42 and 43 by the preselecting mechanism herein before explained and shown in Fig. 1.

The front shifting plate 59 and the front neutralizing plate 67 co-act with each other in a manner identical with that described in connection with the rear neutralizing plate 69 and the rear shifting plate 72. The front shifting plate 59 is connected to the front neutralizing plate 67 by means of a lever 79 that is pivoted on the pin 64 of Figs. 8 and 12 and as shown particularly in Fig. 6 to which reference may now be had. One end of the lever 79 is slotted at 80 to receive the pin 68 of Figs. 9 and 13. The other end of the lever 79 is provided with an upstanding pin 81 upon which is rotatably mounted a guide roller 82 that performs the same functions in connection with the front plates 59 and 67 that the guide roller 78 performs in connection with the corresponding rear plates 72 and 69. The roller 82 is received in the guideway 54 which is positioned in the guide cover 52 diagonally opposite to the guideway 53.

As explained in connection with the operation of the rear plates 69 and 72, the front plates 59 and 67 are not capable of moving relatively to each other as long as the guide roller 82 traverses the straight portion of the guideway 54, although the front shifting plate 59 slidingly engages with the flanges 46 and 47 of the sliding box 41. When the roller 82 enters into the oblique portion of the guideway 54, the front neutralizing plate 67 is brought to a standstill and the front shifting plate 59 continues inwardly in its travel until the guide roller 82 reaches the end of its travel in the guideway 54.

The front neutralizing plate 67, as well as the front shifting plate 59, advance towards or away from the corresponding rear plates 69 and 72 and at the same rate of speed. This relative movement between the front plates and the rear plates is effected by reason of the interconnection between the racks 57 and 58 through the intermediary of the pinion 53$^a$. In operating the gear shifting device, the moving force is applied to the front shifting plate 59 by reason of engagement with the shifting link member 24, this force being transmitted through the rack 58 to the pinion 53$^a$ which, in turn, serves to impart movement to the rack 57 secured to the rear shifting plate 72. Of course, the rear plates 69 and 72 and the front plates 67 and 59 are moved towards, and away from, one another at the same rate by reason of the similarity of the racks 57 and 58 and the similarity of the guideways 53 and 54.

When the front shifting plate 59 and the front neutralizing plate 67 are moving together on the flanges 46 and 47 of the sliding box 41, the front neutralizing plate is continued in its inward movement until it reaches, or is in close proximity to, the neutral position of the lugs 32 and 33. At this time, the guide roller 82 reaches the oblique portion of the guideway 54 and the front neutralizing plate is brought to a standstill while the front shifting plate 59 continues inwardly in its travel. It will, therefore, be observed that both the front and the rear neutralizing plates 67 and 69 do not advance toward each other beyond the limits, except for the thickness of the lugs 32 and 33, defined by the neutral position of these lugs which, in turn, indicates the neutral positions of the two change gears comprised in the speed transmission mechanism. As a consequence, in order to restore either one of the lugs 32 or 33, or both of these lugs, to their neutral position it is only necessary to subtend the selected lug or both lugs by the proper neutralizing plate, this being effected by properly locating the sliding box 41 on the tracks 42 and 43. Then, by moving the front and rear neutralizing plates 67 and 69 toward each other, the desired lug or both lugs, as preferred, will be advanced to neutral position, whereby the change gears in the transmission mechanism may be unmeshed from their driving connection. Of course, it will be observed that simultaneously with the moving of either one of the lugs 32 or 33 to neutral position, the other one of said lugs which must be operated to effect the desired and preselected gear shift is engaged by either the protruding finger 73 secured to the rear shifting plate 72 or by the protruding finger 63 secured to the front shifting plate 59, depending upon the gear shift which it is desired to make in the transmission mechanism.

Figure 6:
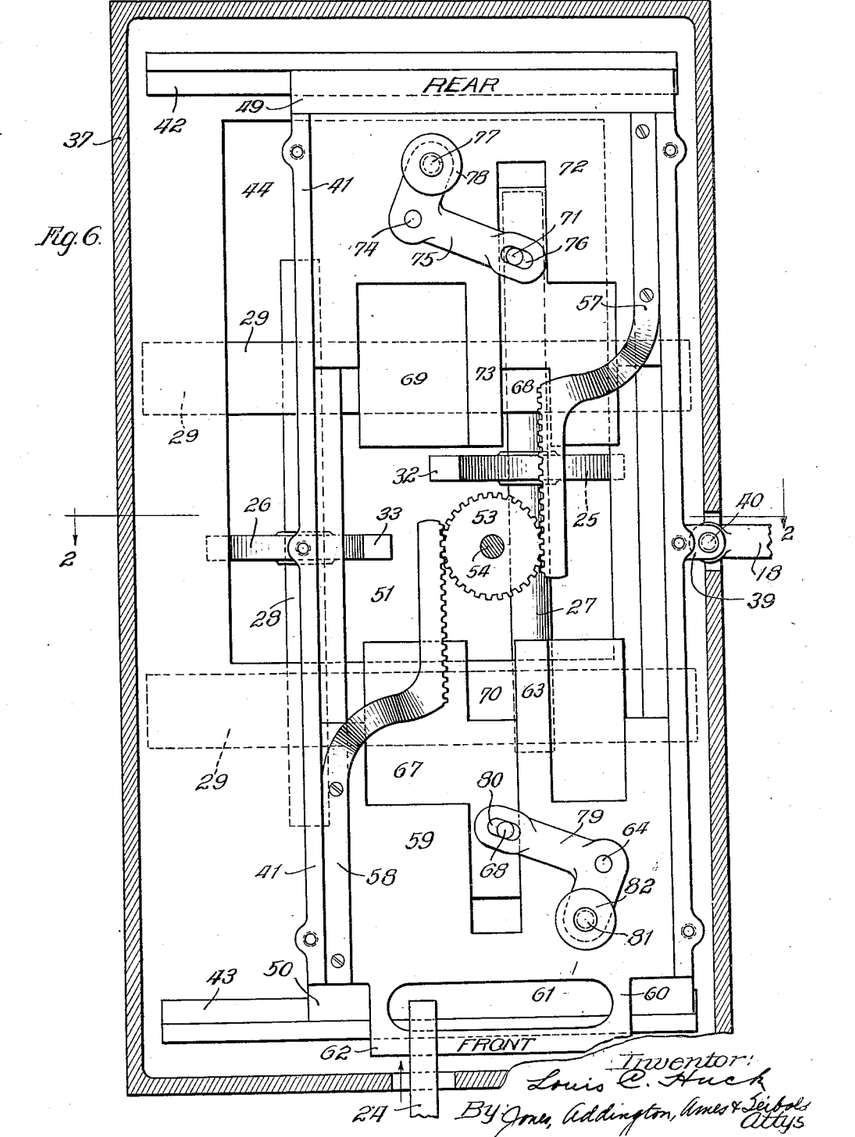
Fig. 6 is a plan view of my gear shifting mechanism with the top of the enclosing case and the guide cover removed therefrom, the various elements being shown in the positions that they may assume under certain predetermined conditions in influencing the setting and operating members.

In Fig. 6, I have shown my gear shifting device in its present embodiment when the various members thereof occupy their normal or inoperative positions, these positions being assumed when the clutch pedal 10 is disengaged thereby permitting the shifting link 24 to move the front shifting plate and the other members associated therewith to their foremost positions. The lug 33 is shown as occupying its neutral position and the lug 32 as occupying such a position whereby the change gear connected thereto is in mesh for effecting a certain driving connection in the speed transmission mechanism. It will be noted that the two guide rollers 78 and 82 occupy such positions as they would occupy at the beginning of travel in their associated guideways 53 and 54 respectively, formed in the guide cover 52. The front neutralizing plate 67 is shown as having its operating end coincident with the operating end of the superimposed front shifting plate 59, which condition obtains as long as the guide roller 82 travels in the straight portion of associated guideway 54 of Fig. 4. Similarly, the rear neutralizing plate 69 has its operating end coincident with the operating end of the superimposed rear shifting plate 72, which condition likewise obtains as long as the guide roller 78 traverses the straight portion of the associated guideway 53 of Fig. 4. The position that the sliding box 41 occupies in Fig. 6 upon the tracks 42 and 43 is arbitrarily preselected in accordance with the mechanism described in connection with Fig. 1. From the figure it is obvious how the rack members 57 and 58 co-act with the common pinion members 53ª, the impelling force for operating said rack members being derived from the shifting link 24.

On pressing the foot clutch pedal 10 of Fig. 1 as hereinbefore mentioned, the shifting link 24 will be moved in the direction indicated by the arrow. As the front and rear neutralizing and shifting plates travel inwardly and towards each other, and also toward neutral position of the lugs, the upstanding lug 32 will be engaged by the operating end of the rear neutralizing plate 69. As the rear shifting plate 72 and the rear neutralizing plate 69 travel in unison towards neutral position, the lug 32 will likewise be moved towards its neutral position thereby unmeshing the change gear associated with said lug.

The two rear plates 69 and 72 are rigidly connected to preclude relative movement therebetween as long as the guide roller 78 traverses the straight portion of the associated guideway 53. When the two rear plates 69 and 72 have moved the lug 32 to its neutral position, the guide roller 78 will then have just arrived at the oblique portion of the guideway 53 and from this point on the rear neutralizing plate 69 will remain stationary and the rear shifting plate 72 will be advanced inwardly. In this fashion, relative movement between the rear neutralizing plate 69 and the rear shifting plate 72 is effected.

As it will be observed, either the finger 73 of the rear shifting plate 72 or the finger 63 of the front shifting plate 69 serves to move the selected lug 32 or 33 into its preselected position thereby making the speed change that is desired in the speed transmission mechanism. Inasmuch as neither one of the two co-planer protruding fingers 63 and 73 subtend either one of the lugs 32 or 33, when occupying the positions shown in Fig. 6, the lugs 32 and 33 will be retained in neutral position whereto the lug 32 has just been moved. The finger 73 will be received in a correspondingly positioned recess formed in the front shifting plate 59 and, likewise, the finger 63 will be received in a correspondingly positioned recess formed in the rear shifting plate 72, these positions being assumed by the two fingers 73 and 63 respectively, when the front and rear shifting plates have reached their most advanced positions at the end of travel of the shifting link 24.

Figure 7:
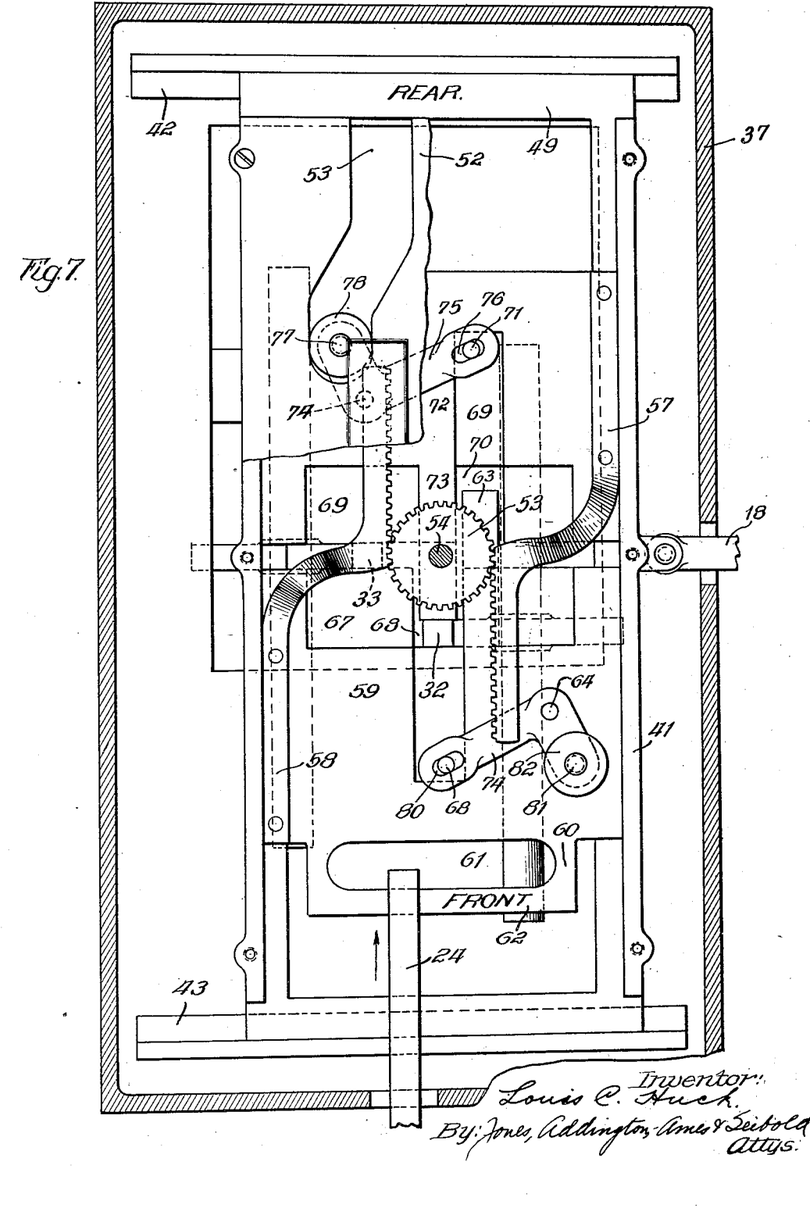
Fig. 7 is a view similar to that of Fig. 6, the elements in this view occupying different positions from those occupied by the corresponding elements in Fig. 6 by reason of other predetermined conditions obtaining in the operating and setting members.

In Fig. 7 I have shown my gear shifting device in the position that it occupies when the lug 33 is in neutral position and the lug 32 is in such a position that its associated change gear is in mesh with certain gear elements comprised in the speed transmission mechanism other than those gear elements with which said associated change gear was in mesh with when occupying the position of Fig. 6, the link member 24 having been moved to the length of its travel in the direction indicated by the arrow. In other words, Fig. 7 shows the arrangement of the elements comprised in my present gear shift device when the clutch pedal 10 has been depressed in proximity to its lowest position. The guide roller 78 is shown as occupying the position it reaches at the end of its travel in the guideway 53 formed in the guide cover 52 and, likewise, the roller 82 is shown as occupying a corresponding position in its associated guideway 54.

It will be seen that the opposed operating ends of the two neutralizing plates 67 and 69 engage the lug 33 on its opposite sides, thereby spacing the operating ends of the rear and front neutralizing plates from each other since the lug 33 occupies its neutral position. The lug 32 has been engaged by the protruding finger 73 of the rear shifting plate 72 and has been moved into the recess 68 formed in the front neutralizing plate 67, which recess coincides with a correspondingly positioned recess formed in the front shifting plate 59. It will be apparent from Figs. 6 and 7 that the positioning of either of the two protruding fingers 63 and 73 formed respectively on the front and rear shifting plates 59 and 72, may be varied relatively to either one of the lugs 32 or 33 by properly positioning the sliding box 41 upon the tracks 42 and 43. As hereinbefore mentioned, the location of the sliding box 41 is controlled by the rod 18 that, in turn, is actuated by the setting lever 15 of Fig. 1.

Figure 14:
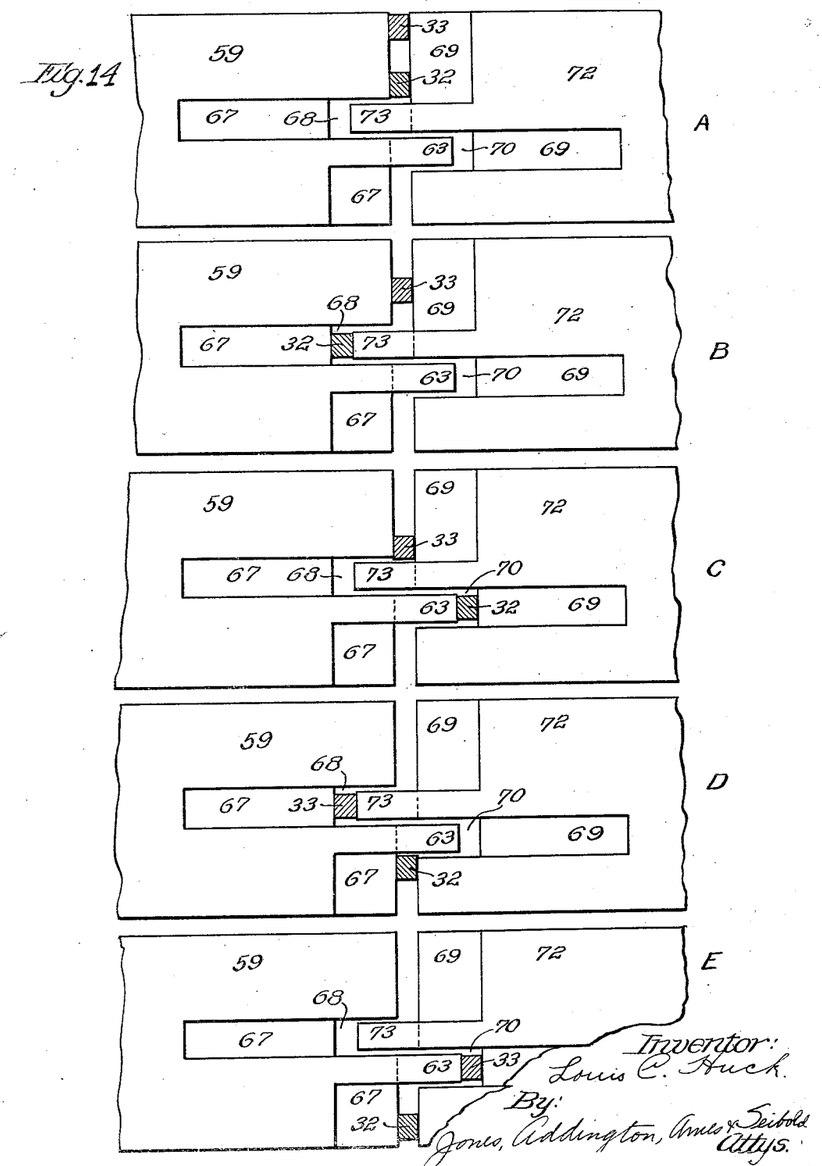
Fig. 14 is a diagram showing the various positions occupied by the two lugs of the sliding forks that are severally connected to the two change gears comprised in the transmission mechanism to which my gear shifting device is applied for the purpose of illustration, and which are operated mechanically by my present device, the said lugs being shown as occupying their relative positions for each one of the group of gear shifts that are capable of being made in a standard speed transmission mechanism for automobiles.

In Fig. 14, I have shown the positions occupied by the lugs 32 and 33 and by the front shifting plate 59, the front neutralizing plate 67, the rear shifting plate 72 and the rear neutralizing plate 69 for the various gear shifts that a standard speed transmission mechanism is capable of undergoing. It is to be understood that the two upstanding lugs 32 and 33, which separately control the two change gears comprised in the speed transmission mechanism, may be moved only longitudinally with respect to the direction of the movement of the said plates 59, 67, 69 and 72 and that the positioning of said plates relative to, and transversely of, the two upstanding lugs 32 and 33 may be varied at will by operating the preselecting mechanism described in connection with Fig. 1.

Diagram A, shows the positions occupied by the said operating elements or plates when the two lugs 32 and 33 occupy neutral position when the clutch pedal 10 is depressed. It is to be observed that the protruding finger 73 subtends the recess 68 and that the protruding tongue 63 subtends the recess 70.

In Diagram B, the lug 33 is shown as occupying neutral position and the lug 32 as being engaged by the finger 73 and received in the recess 68. This is the condition obtaining when the speed change designated as "reverse" has been effected, and the clutch pedal 10 occupies a depressed position.

Diagram C, shows the conditions obtaining when the speed transmission mechanism is arranged for first speed; Diagram D shows the conditions obtaining when the speed transmission mechanism is arranged for second speed; Diagram E shows the conditions obtaining when the speed transmission mechanism is arranged for third speed, all of said diagrams designating the positions occupied by the various elements when the clutch pedal 10 occupies a depressed position at which it arrives at the time that the desired gear shift has been made.

From the foregoing description of my gear preselecting and shifting device it will be observed that the various gear shifts of which a standard automobile speed transmission mechanism is capable of undergoing may be mechanically performed by a foot pedal which, in the embodiment shown, is the same pedal that controls the operation of the clutch mechanism and that, in all instances, a preselection of the desired gear shift may be made while any other of the possible gear shifts is being operated. This will be apparent by referring to Fig. 6 which clearly indicates that the entire gear shift mechanism may, at all times, be moved relatively to the two lugs 32 and 33 without being obstructed by said lugs in its movements, the same being conducted, of course, when the clutch pedal is in its inoperative or normal position.

Again, it will be noted that a certain gear shift having been once established, such as that represented by the relative positions occupied by the lugs 32 and 33 in Fig. 7, the change gear associated with the lug 32 will be permanently kept in mesh even though the clutch pedal 10 is repeatedly depressed to the full length of its travel, this condition obtaining as long as the sliding box 41 occupies the position shown. Of course, if the position of the sliding box 41 is changed from that position which it has assumed to make a previous gear shift, the change gear that is already in mesh will be disengaged when the clutch pedal 10 is depressed, this disengagement, however, restoring the said change gear to its neutral position only.

Again, it will be apparent from the foregoing description of my device that the gear shifting operations are effected by the positive actuation of the clutch pedal and that it is not necessary to proceed along a definite sequence or cyclical order of operative connections in making the gear shifts. This mode of operation is important since it gives the operator in control of the mechanism complete freedom to preselect a gear change without passing through any other gear shifts that may not be desired. Moreover, the change gear that is in operative connection will be restored to neutral or inoperative position before the subsequent and preselected gear change is made, the restoring of said previously engaged change gear to neutral position being effected by the same movement of the clutch pedal that effects the subsequent and preselected gear shift.

From the simplicity of the structure of my present device, it will be obvious that my mechanism may be applied to any of the usual standard automobile speed transmission mechanisms of the sliding gear type and that the various gear changes or shifts that such a speed transmission mechanism is capable of, may be conveniently effected without any skill being required on the part of the operator. The present gear shifting and preselecting device is simple in its construction and when assembled forms a compact structure that may be applied to an automobile speed transmission mechanism without readapting the floor of the automobile for such purposes.

It is to be understood, of course, that while the clutch pedal 10 serves to engage and disengage the clutch of the automobile and, at the same time, to effect the speed change operations of the gear shift device, the clutch pedal is connected through the usual lost motion connection before either the gear shift device or the clutch may be operated. This mode of action is well known in the art and is commonly employed in automotive construction.

While I have described my present gear shifting device in connection with a speed transmission mechanism of the sliding gear type, it will be obvious that my device may be used in connection with any speed transmission mechanism which is capable of a series of adjustments wherewith different speed changes may be made. In all such speed transmission mechanisms certain elements are accessible, such as the lugs 32 and 33 illustrated in the drawings of this present application, which members serve to effect the speed changes desired. Therefore, it is to be understood that, while in the specification I have mentioned the gear changes and gear shifts to be made in the speed transmission mechanism, I have contemplated the speed changes that are to be effected, because in some of the speed transmission mechanisms, change gears are not incorporated but the speed changes that such a transmission mechanism is capable of undergoing are effected through the action of dogs or sliding keys and the like.

Again, any of the usual mechanical expedients may be employed in connection with my gear shifting device for ensuring the proper setting of the gear shifting device in alignment with the change gears or other elements of the speed transmission mechanism through which the speed changes are effected. For instance, if the linkage mechanisms between the selecting mechanism and the clutch pedal become worn so as to permit of a certain amount of free play, the gear shifting device may nevertheless be properly positioned through the action of spring pressed dogs or other well known mechanical expedients.

In some instances, both the neutralizing plate and the shifting plate serve to move the exposed lugs to neutral position and for the purposes of description herein, the front neutralizing and front shifting plates may be considered as a unit, up to the time that the neutral position is reached, and similarly the rear shifting plate and the rear neutralizing plate, because up to the neutral position the pair of front plates act in unison as well as the pair of rear plates. After neutral position is reached, relative movement between the plates constituting each pair is effected, and the plates then severally perform different functions, as herein described.

While I have shown but one embodiment of my invention only, it is to be understood that my invention is not necessarily limited to this particular embodiment, as changes may be made in the structure and relative arrangement of the parts, elements and members comprised in my present gear shift device without departing from the spirit and scope of the appended claims.

Having thus described my invention what I now claim as new and desire to secure by Letters Patent is:

1. A device of the character described comprising front and rear shifting members for effecting gear shifts in an associated variable speed transmission mechanism from neutral position to the meshing connections, front and rear neutralizing members severally associated with said front and rear shifting members and serving to effect gear shifts from meshing connections to neutral position, means for varying, at will, the transverse positions relative to said speed transmission mechanism of said front and rear members whereby preselection in gear shifts may be effected, and means for moving said front and rear members relatively to, and longitudinally of, one another whereby the preselected gear shift in said associated speed transmission mechanism may be made subsequent to restoring any interfering gear shifts to neutral position.

2. The combination with shiftable elements of a variable speed transmission mechanism, of a device comprising coplanar and opposed shifting members and coplanar and opposed neutralizing members for engaging said shiftable elements to effect the desired speed changes in the said speed transmission mechanism without interference, said device comprising a selector mechanism for positioning said device, at will, transversely of said shiftable elements, and an actuating mechanism for engaging in a longitudinal direction the selected one of said shiftable elements with one of said shifting members to effect the desired speed change in said transmission mechanism in accordance with the setting obtaining on said selector mechanism subsequent to restoring to inoperative condition any other shiftable element in said transmission mechanism by means of one of said neutralizing members.

3. A device of the character described comprising a box member, means for moving said box member, front sliding and neutralizing members supported in said box member and adapted to slide relatively to each other and to slide in unison relatively to said box member, correspondingly opposed and co-planar rear sliding and neutralizing members supported in said box member and adapted to slide relatively to each other and to slide in unison relatively to said box member, and means associated with each group of said front and rear members whereby the front and rear neutralizing members may be simultaneously halted in their movements while the associated front and rear sliding members may continue their movements longitudinally of said box member.

4. A device of the character described comprising a box member, means for moving said box member, front neutralizing and sliding members that are slidingly mounted in said box member to move longitudinally thereof, rear neutralizing and sliding members that are co-planar with said corresponding front members and are slidingly mounted in said box member to move longitudinally thereof, means for moving said front members in unison for a portion of their travel and for halting the movement of one of said front members, means for moving said rear members in unison for a portion of their travel and for halting the movement of one of said rear members, and means interconnecting one of said front members to one of said rear members whereby simultaneous movement of said members may be effected.

5. A device of the class described comprising a supporting member, means for moving said supporting member, front neutralizing and shifting members slidingly mounted in said supporting member and adapted to move longitudinally of each other, rear neutralizing and shifting members slidingly mounted in said supporting member and adapted to move longitudinally of each other, means whereby said front members may be moved in unison with, and in opposite directions to said rear members, and means whereby said front and rear neutralizing members may be simultaneously halted in their longitudinal travel and said front and rear shifting members may continue in their longitudinal travel.

6. A device of the character described comprising a supporting member, means for positioning said supporting member, front, shifting and neutralizing members mounted in said supporting member, rear shifting and neutralizing members likewise mounted in said supporting member, means for moving longitudinally said front members towards and away from said rear members and for moving longitudinally said rear members towards and away from said front members, and means for moving said neutralizing members in unison with said shifting members for a portion of their travel and for halting said neutralizing members while said shifting members continue their travel.

7. A device of the character described comprising a supporting member, means for positioning said supporting member, front shifting and neutralizing members mounted in said supporting members, rear shifting and neutralizing members mounted in said supporting member, means for longitudinally moving said front members and said rear members in unison, and means for simultaneously halting the movements of said neutralizing members while said shifting members are moved relatively thereto.

8. A device of the character described comprising front and rear shifting members, front and rear neutralizing members, means for moving said members transversely of their direction of movement and means for moving said members longitudinally and relatively to one another.

9. A device of the character described comprising front and rear shifting members, front and rear neutralizing members severally associated respectively with said front and rear shifting members, a preselector mechanism for moving said members transversely of their direction of movement and a foot pedal for moving said members longitudinally and relatively to one another.

10. In combination with shiftable elements of a variable speed transmission mechanism, of a speed change device to engage said shiftable elements to effect speed changes in said speed transmission mechanism, said speed change device comprising front and rear shifting members, and corresponding front and rear neutralizing members, said front members and said rear members being normally positioned to the front and rear respectively of neutral position of said shiftable elements, means for moving said front members and said rear members in unison towards the neutral position of said shiftable elements, and means for halting said front and rear neutralizing members when they reach said neutral position and for continuing the movements of said front and rear shifting members beyond said neutral position.

11. In combination with shiftable elements of a variable speed transmission mechanism, of a speed change device to engage said shiftable elements whereby speed changes in said speed transmission mechanism may be effected, said speed change device comprising front and rear shifting plates, front and rear neutralizing plates, said front plates being superimposed one upon the other and normally positioned to the front of neutral position of said shiftable elements and said rear plates being superimposed one upon the other and normally positioned to the rear of neutral position of said shiftable elements, means for longitudinally moving said front members and rear members in unison towards neutral position of said shiftable elements, means for halting the longitudinal movements of said neutralizing members when they are in proximity to said neutral position and for continuing the longitudinal movements of said shifting members beyond said neutral position, and means for varying the transverse positions of said front and rear members relative to said shiftable elements.

12. In combination with shiftable elements of a variable speed transmission mechanism, of a speed change device to engage said shiftable elements to effect speed changes in said speed transmission mechanism, said speed change device comprising front and rear shifting members, front and rear neutralizing members, said front members and said rear members being normally positioned to the front and to the rear, respectively, of neutral position of said shiftable elements, a foot pedal which, by its positive actuation, is adapted to move said front members and said rear members in unison towards neutral position of said shiftable elements, means for halting the longitudinal movements of said front and rear neutralizing members when they come in proximity to said neutral position and for continuing the longitudinal movements of said front and rear shifting members beyond said neutral position, and means for transversely positioning said front and rear members relatively to said shiftable members.

13. In a device of the character described, the combination with a supporting member, and means for positioning, at will, said supporting member, of two superposed plate members, one of which is seated in and slidingly engages with the other, said plate members being slidingly mounted in said supporting member, and means whereby both of said plate members may move in unison relative to said supporting member for a portion of their travel and whereby one of said plate members may be halted in its travel while the other of said plate members moves relatively thereto and to said supporting member.

14. In a device of the character described, the combination with a supporting member, and means for positioning said supporting member, of two superposed plate members slidably mounted on said supporting member, one of said plate members being slidingly received in the other of said plate members, a pivoted member connecting said plate members to each other, and a guiding member for controlling the movements of said pivoted member whereby said plate members may slide in unison on said supporting member for a portion of their travel and slide relatively to each other at another position in their line of travel.

15. In a device of the character described, the combination with a supporting member, and a preselector mechanism for positioning, at will, said supporting member, of two superposed plate members slidably mounted on said supporting member and adapted to slide relatively to each other, an actuating member pivoted to one of said plate members and connected to the other of said plate members for effecting relative movement therebetween, and a guiding member for controlling the movement of said actuating member about its pivot.

16. In a device of the character described, the combination with a supporting member, and a preselector mechanism for positioning, at will, said supporting member, of two superposed plate members slidably mounted on said supporting member and adapted to slide relatively to each other, an actuating member pivoted to one of said plate members and connected to the other of said plate members for effecting relative movement therebetween, and a guiding member for causing said two plate members to move in unison for a portion of their travel on said supporting member and to slide relatively to each other at another position in their line of travel on said supporting member.

17. In a device of the character described, the combination with a supporting member and a selector mechanism for transversely positioning, at will, said supporting member, of two superposed plate members mounted on said supporting member and adapted to slide longitudinally thereof as well as to slide relatively to each other in a longitudinal direction, a pivot member connecting said plate members to each other, a guiding member engaging said pivot member and controlling its movement whereby said plate members may slide longitudinally in unison on said supporting member for a portion of their travel and then slide relatively to each other when one of said plate members is halted, and a foot pedal which on its positive actuation effects operative engagement between said guiding member and said pivot member.

18. In a device of the character described, the combination with a supporting member, and means for positioning said supporting member, of two superposed front plate members slidably mounted on said supporting member, two superposed rear plate members slidably mounted on said supporting member, said rear plate members being opposed to said front plate members and corresponding front and rear plate members being slidably received respectively in the other of said front and rear plate members, pivot members severally connecting the front plate members to each other and the rear plate members to each other, guiding members severally engaging said pivot members for controlling their movements whereby said front plate members may slide in unison with said rear plate members on said supporting member, and said front plate members and said rear plate members may slide relatively to each other, and means interconnecting corresponding rear and front plate members whereby an actuating force applied to one pair of said plate members may be transmitted to the other pair of plate members.

In witness whereof, I have hereunto subscribed my name.

LOUIS C. HUCK.

Witness:
GEO. W. HANSEN.